United States Patent [19]

Fox et al.

[11] Patent Number: 4,983,719

[45] Date of Patent: Jan. 8, 1991

[54] AMORPHOUS POLYAMIDE HAVING EXCELLENT OXYGEN BARRIER PROPERTIES FROM PARA-XYLYLENE DIAMINE, ISOPHTHALIC ACID AND ADIPIC ACID

[75] Inventors: Daniel W. Fox, Pittsfield; Edward N. Peters, Lenox, both of Mass.; Geoffrey H. Riding, Castleton, N.Y.; G. Fred Willard, Dalton, Mass.

[73] Assignee: General Electric Company, Pittsfield, Mass.

[21] Appl. No.: 383,841

[22] Filed: Jul. 21, 1989

[51] Int. Cl.$^5$ ............................................. C08G 69/26
[52] U.S. Cl. ................................. 528/339; 528/338; 528/340; 528/347
[58] Field of Search ................ 528/339, 338, 340, 347

[56] References Cited

U.S. PATENT DOCUMENTS

| | | | |
|---|---|---|---|
| 3,426,001 | 2/1969 | Ridgway | 260/78 |
| 4,018,746 | 4/1977 | Brinkmann et al. | 260/78 |
| 4,482,695 | 11/1984 | Barbee et al. | 528/208 |
| 4,640,973 | 2/1987 | Davis et al. | 528/208 |

Primary Examiner—Harold D. Anderson
Attorney, Agent, or Firm—Spencer D. Conard; William F. Mufatti

[57] ABSTRACT

An amorphous polyamide resin is provided having the combined properties of a high glass transition temperature and excellent oxygen barrier properties. The polyamide is obtained from the reaction products of para-xylylene diamine, adipic acid and isophthalic acid, and finds particular utility as a container layer for hot fill packaging of fruit juices.

14 Claims, No Drawings

AMORPHOUS POLYAMIDE HAVING EXCELLENT OXYGEN BARRIER PROPERTIES FROM PARA-XYLYLENE DIAMINE, ISOPHTHALIC ACID AND ADIPIC ACID

This invention relates to amorphous polyamides and, more particularly, relates to amorphous polyamides obtained by reacting p-xylylene diamine with adipic acid and isophthalic acid.

BACKGROUND OF THE INVENTION

Retort packaging is common in the fruit juice industry where hot juices, typically at temperatures ranging from 80° C. to 120° C., are filled directly into the final disposable commercial packaging. By filling with hot juice, the container is simultaneously filled and sanitized. The use of polyamides as layers in such retort packaging has generally been unsuitable for a number of reasons, namely, many polyamides are crystalline in nature, lacking the level of clarity necessary for aesthetically pleasing clear containers; some polyamides lack a glass transition temperature sufficiently high enough to maintain the shape of the container and prevent deformation thereof during hot fill; and some polyamides lack the oxygen barrier properties necessary to prevent oxidation and discoloration of fruit juices held by containers made therefrom. Conventional polyamides include those set forth in NL Pat. No. 7,212,060; U.S. Pat. Nos. 4,018,746; 4,482,695; and 4,640,973; these polyamides generally suffer from either having a relatively low glass transition temperature, employing relatively high cost monomers, or exhibiting relatively low levels of clarity.

Accordingly, one object of the present invention is to provide a polyamide which has the combined properties of a high glass transition temperature, excellent clarity, and a low oxygen transmission rate.

Another object of the present invention is to provide an amorphous polyamide resin suitable as a container layer for hot filled fruit juices or other hot filled, oxygen sensitive liquids.

SUMMARY OF THE INVENTION

The present invention provides a novel polyamide which is transparent, has a glass transition temperature which is sufficiently high to handle hot fill packaging, and has oxygen barrier properties which are sufficient to protect fruit juice from oxidation and discoloration, thereby permitting containers made therefrom to provide extended shelf lives to fruit juices contained therein. The polyamide of the present invention is obtained from reaction products of para-xylylene diamine, adipic acid and a phthalic acid composition.

DETAILED DESCRIPTION OF THE INVENTION

The present polyamide is prepared by reacting a diamine with a dicarboxylic acid. The term dicarboxylic acid is meant to include diaryl esters and dihalides thereof. The diamine is para-xylylene diamine; and the dicarboxylic acid is a mixture of respective amounts of a phthalic acid composition and adipic acid. The phthalic acid composition contains isophthalic acid and optionally terephthalic acid. Preferably, the phthalic acid composition is present at a level of from about 80 mole % to 40 mole % based on the total moles of dicarboxylic acid; more preferably at a level of from about 80 to 60 mole % thereof; and most preferably at a level of from about 80 mole % thereof. Preferably the adipic acid is present at a level of from about 20 to 60 mole % based on the total moles of dicarboxylic acid; more preferably at a level of from about 20 to 40 mole % thereof and most preferably at a level of 20 mole % thereof. The phthalic acid composition may consist of isophthalic acid or may comprise respective amounts of isophthalic acid and terephthalic acid. The phthalic acid composition may include isophthalic acid present at a level of from 60 to 100 mole % based on the total moles of phthalic acid composition, more preferably at a level of from 80 to 100 mole % thereof, and most preferably at a level of 100% thereof. The terephthalic acid may be present at a level of from 0 to 40 mole percent based on the total moles of phthalic acid composition, more preferable at a level of from 0 to 20 mole percent thereof, and most preferably at a level of 0 mole percent thereof. Suitable phthalic acid compositions containing a mixture of isophthalic acid and terephthalic acid may have terephthalic acid present at a level of from 1 to 40 mole % based on the total moles of phthalic acid composition, more preferably from 1 to 20 mole % thereof; and have isophthalic acid present at a level of from 60 to 99 mole % based on the total moles of phthalic acid composition, more preferably from 80 to 99 mole % thereof. If excess levels of terephthalic acid are present in the phthalic acid composition then the polyamide will more likely be a crystalline polyamide. The desired amorphous polyamide is obtained from the reaction products of the para-xylylene diamine, phthalic acid composition and adipic acid. The diamine and dicarboxylic acid are reacted in mole ratios of from between 48:52 and 52:48 and preferable in a mole ratio of 50:50.

The para-xylylene diamine has the following structural formula:

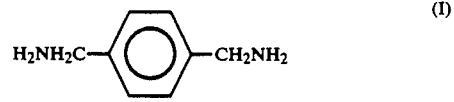
(I)

and can be prepared by oxidizing p-xylylene in the presence of ammonia to obtain a cyano compound which upon hydrogenation forms para-xylylene diamine. These reactions can be represented as follows:

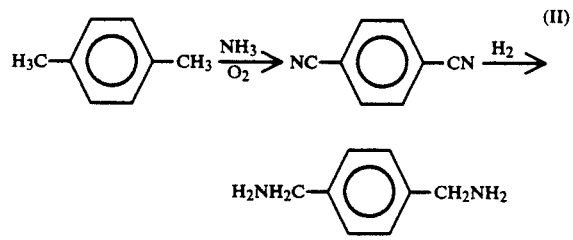
(II)

This reaction produces high yields, often greater than 90% yields, of para-xylylene diamine thereby potentially permitting low-cost production of para-xylylene diamine.

Isophthalic acid can be represented by the following chemical structure:

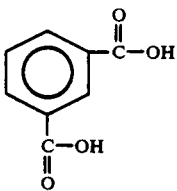

(III)

and has the properties of being in the form of colorless crystals and has a melting point of 345° C. to 348° C. Isophthalic acid can be derived from the oxidation of m-xylene.

Terephthalic acid can be represented by the following chemical structure:

(IV)

Adipic acid has the chemical formula of HOOC(CH$_2$)$_4$COOH and is commercially available.

The polyamides of the present invention are prepared by methods generally known in the art for producing polyamides such as by conventional salt processes which involve reacting a diamine with a dicarboxylic acid in a solvent to form a solid polyammonium salt which precipitates from the reaction mixture. The solid is then heated successively in an autoclave reactor under pressure to control explosive initial dehydration and subsequently under reduced pressure to effect conversion of the polyammonium salt to a polyamide. The diamine and dicarboxylic acid component are preferably reacted in approximately stoichiometric quantities.

The polyamides may also be prepared by a melt process involving the reaction of the diamine and a diaryl ester of the dicarboxylic acid. A suitable melt process is set forth in Fox et al U.S. Pat. No. 4,567,249.

The preferred polyamide resin of the present invention has first moieties represented by the following formula:

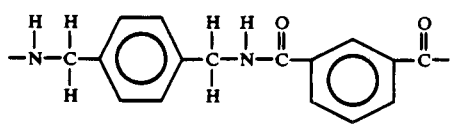

(V)

; and second moieties represented by the following formula:

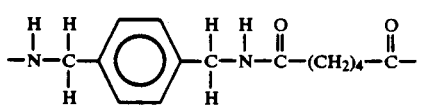

(VI)

Preferably, the first moieties are present in the polyamide at a level of from 80 mole % to 40 mole % based on the total moles of first and second moieties in the polyamide and preferably the second moieties are present at a level of from 20 mole % to 60 mole % based on the total moles of first and second moieties in the polyamide. More preferably, the polyamide has from about 80 mole % to about 60 mole % of the first moieties based on the total moles of first and second moieties and from about 20 mole % to about 40 mole % of the second moieties based on the total moles of first and second moieties. Most preferably, the polyamide consists essentially of about 80 mole % of the first moieties based on the total moles of first and second moieties and about 20 mole % of the second moieties based on the total moles of first and second moieties. The most preferred polyamide resin has a glass transition temperature of at least 170° C. and an oxygen transmission rate of at most about 0.50 cc-mil/100 in$^2$-day-atm. The preferred polyamide is obtained from the reaction products of a mixture consisting essentially of about 50 mole % of para-xylylene diamine based on the total moles of diamine and dicarboxylic acid; from about 40 mole % to about 20 mole % of adipic acid based on the total moles of diamine and dicarboxylic acid; and from about 10 mole % to about 30 mole % of the isophthalic acid based on the total moles of diamine and dicarboxylic acid.

The polyamide resin of the present invention is clear, amorphous having no distinct melting point and preferably has an intrinsic viscosity in deciliters per gram (dl/g) of between about 0.40 and about 1.60 as measured in 40:60 weight mixture of tetrachloroethylene and phenol; preferably a glass transition temperature of at least 130° C., more preferably a glass transition temperature of between 150° and 180° C., and most preferably a glass transition temperature of about 174° C.; and preferably has an oxygen transmission rate of at most about 1.0 cc-mil/100 in$^2$-24 hr-atm, more preferably has an oxygen transmission rate of at most about 0.5 cc-mil/100 in$^2$-24 hr-atm, and most preferably has an oxygen transmission rate of at most about 0.3 cc-mil/100 in$^2$-24 hr-atm.

The oxygen transmission rate or permeability of the resin is measured as cubic centimeters of oxygen permeating a 1 mil thick sample, 100 inches square, for a 24-hour period under an oxygen partial pressure difference of 1 atmosphere at 30° C.

The polyamide resin of the present invention may be made into film or sheet, may be used as a laminating layer between two permeable layers of film, may be used to make molded containers by coextrusion blow molding or other molding techniques, and may be employed to form a coextruded layer.

Containers employing a layer of the polyamide resin of the preset invention are suitable for the hot fill of fruit juices therein. Hot filling of juices involves filling of the container with juices having temperatures of from about 80° C. to about 120° C. These high temperatures permit simultaneous filling and sanitizing of the interiors of the containers. The high glass transition temperature of the resin enables the containers to keep their shapes and avoid deformation during hot fill. The oxygen barrier properties of the resin enable the containers to provide long shelf life to the fruit juices therein by preventing oxidation thereof by atmospheric oxygen, the amorphous character of the polyamide resin results in containers made therefrom being clear thereby enhancing the aesthetics of the container, allowing the consumer to see the true appearance of the juice to be purchased, and the potentially relatively low cost diamine and diacids employed potentially enhance the cost competitiveness of containers made from the resin. Preferably containers employ the amorphous polyamide as an intermediate layer between inner and outer layers of aromatic polycarbonate. Suitable containers may be made by coextrusion blow molding. Suitable aromatic polycarbonate resins are made by reacting phosgene with bisphenol A.

The invention is further described in the examples which follow. These examples are illustrative of the invention and are not to be construed in limitation thereof.

Table 1 sets forth polyamides obtained by reacting para-xylylene diamine with isophthalic acid, adipic acid and mixtures thereof. Note that the polyamides of examples 1, 5 and 6 were crystalline whereas the polyamides of examples, 2, 3 and 4 were amorphous having no distinct melting point.

Table 2 sets forth polyamides obtained from reacting various diamines with various diaryl esters. Note that the polyamides derived from para-xylylene diamine typically had higher glass transition temperatures than corresponding polyamides derived from meta-xylylene diamine.

TABLE 1

| Example | Mole % of[e] Isophthalic Acid | Mole % of[f] Adipic Acid | IV[a] | Tg[b] | Tm[c] | OXTR[d] |
|---|---|---|---|---|---|---|
| 1 | 100 | 0 | — | — | 296 | — |
| 2 | 80 | 20 | 1.02 | 176 | — | .33 |
| 3 | 60 | 40 | 1.51 | 158 | — | .29 |
| 4 | 40 | 60 | 1.58 | 137 | — | — |
| 5 | 20 | 80 | 1.43 | 129 | >300 | — |
| 6 | 0 | 100 | — | — | >300 | — |

TABLE 2

| Example[g] | Diamine[h] | Diaryl Ester[i] | Tg (°C.)[b] | IV[a] | OXTR[d] |
|---|---|---|---|---|---|
| 7 | MXDA/HMDA 50/50 | DPI 100 | 154 | 0.85 | 0.85 |
| 8 | PXDA/HMDA 50/50 | DPI 100 | 159 | 0.97 | 1.03 |
| 9 | MXDA 100 | DPI/DPA 60/40 | 142 | 0.79 | — |
| 10 | PXDA 100 | DPI/DPA 60/40 | 158 | 1.51 | 0.28 |
| 11 | MXDA 100 | DPI/DPA 40/60 | 119 | 1.23 | — |
| 12 | PXDA 100 | DPI/DPA 40/60 | 137 | 1.58 | — |
| 13 | MXDA 100 | DPI/DPT/DPA 56/24/20 | 157 | 0.69 | 0.39 |
| 14 | PXDA 100 | DPI/DPT/DPA 56/24/20 | 175 | 0.82 | 1.11 |
| 15 | MXDA 100 | DPA/DPI 20/80 | 156 | 0.86 | 0.36 |
| 16 | PXDA 100 | DPA/DPI 20/80 | 174 | 0.99 | 1.10 0.33 |
| 17 | MXDA 100 | DPI 100 | 176 | 0.79 | 0.36 |
| 18 | PXDA 100 | DPI 100 | 182 | 0.40 | 3.00 |

FOOTNOTES FOR TABLES

[a]Intrinsic Viscosity is determined for the resultant polyamides at 25° C. in a 40/60 tetra chloro ethylene/phenol mixture.

[b]Tg is the glass transition temperature in °C.

[c]Tm is the melting temperature of the polyamide. Examples 1, 5 and 6 had melting points which indicates they were crystalline in nature and therefore would not provide clear resin. Examples 2, 3 and 4 had no melting point and therefore are amorphous in character and would provide clear resin for container layers.

[d]OXTR = $O_2$ permeability is in cc-mil/100 $in^2$-day-ATM. Note that the oxygen permeability (oxygen transmission rates) of the polyamide of Examples 2 and 3 are very low, less than 0.50 cc-mil/100 $in^2$-day-ATM.

[e]Mole percent of isophthalic acid is based on the total moles of dicarboxylic acid reacted with the para-xylylene diamine to obtain the polyamide.

[f]Mole percent of adipic acid is based on the total moles of dicarboxylic acid reacted with the para-xylylene diamine to obtain the polyamide.

[g]Examples 7-18 involve the reaction of a diaryl ester and a diamine or mixture of diamines to obtain a polyamide.

[h]The amounts in the Diamine column are listed as mole percent of total diamine reacted to obtain the polyamide of the example. The diamine employed to obtain the polyamide of example 7 was 50 mole percent meta-xylylene diamine and 50 mole percent hexamethylenediamine. MXDA = meta-xylylene diamine; HMDA = hexamethylene diamine; PXDA = para-xylylene diamine.

[i]The amounts in the Diaryl Ester column are listed as mole percent of total diamine reacted to obtain the polyamide of the example. DPI = diphenyl isophthalate; DPA = diphenyl adipate.

What is claimed:

1. A polyamide consisting of first moieties having a formula of:

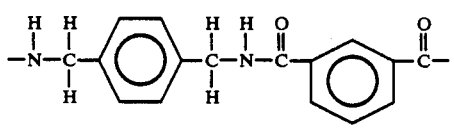

, and second moieties having a formula of:

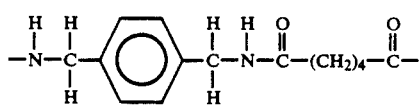

said first moieties being present in said polyamide at a level of from 80 mole % to 40 mole % based on the total moles of first moieties and second moieties in said polyamide, said second moieties being present at a level of 20 mole % to about 60 mole % based on the total moles of first moieties and second moieties in said polyamide.

2. The polyamide of claim 1 wherein said polyamide consists of from about 80 mole % to about 60 mole % of said first moieties based on the total moles of first and second moieties, and from about 20 mole % to about 40 mole % of said second moieties based on the total moles of first and second moieties.

3. The polyamide of claim 1 wherein said first moieties are present at a level of about 80 mole % and said second moieties are present at a level of about 20 mole %.

4. The polyamide of claim 3 wherein said polyamide has a glass transition temperature of at least 170° C. and an oxygen transmission rate of at most about 0.50 cc-mil/100 in²-day-atm.

5. A polyamide obtained from a mixture consisting of para-xylylene diamine, adipic acid, and isophthalic acid.

6. The polyamide of claim 5 wherein said mixture consists of about 50 mole % of said para-xylylene diamine based on the total moles of diamine, adipic acid and isophthalic acid; from about 40 mole % to about 20 mole % of said adipic acid based on the total moles of diamine, adipic acid and isophthalic acid; and from 10 mole % to 30 mole % of said isophthalic acid based on the total moles of diamine, adipic acid and isophthalic acid.

7. A packaging material for fruit juices, said packaging material comprising a layer of amorphous polyamide, said polyamide consisting of from about 80 mole % to about 40 mole % of first moieties and from about 20 mole % to about 60 mole % of second moieties, said first moieties having a formula of:

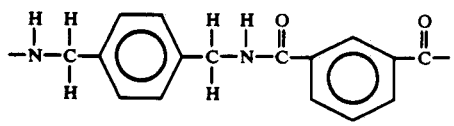

, said second moieties having a formula of:

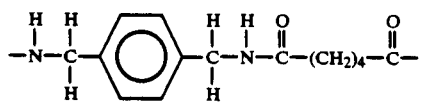

8. The packaging material of claim 6 wherein said layer has an oxygen transmission rate of less than about 0.50 cc-mil/100 in²-day-atm, and said polyamide has a glass transition temperature of at least 130.

9. A transparent polyamide derived from a mixture of diamine and dicarboxylic acid, said diamine comprising paraxylylene diamine, said dicarboxylic acid comprising adipic acid and isophthalic acid, (a) said para-xylylene diamine being present at a level of about 50 mole % based on the total moles of diamine and dicarboxylic acid, (b) said adipic acid being present at a level of from 20 mole % to 40 mole % based on the total moles of diamine and dicarboxylic acid, and (c) said isophthalic acid being present at a level of from 10 mole % to 30 mole % based on the total moles of diamine and dicarboxylic acid, said diamine and dicarboxylic acid being in mole ratios of from between 48:52 and 52:48.

10. The polyamide of claim 9 wherein said adipic acid and said isophthalic acid are in a mole ratio of from between 20:80 and 80:60.

11. The polyamide of claim 10 wherein said adipic acid and said isophthalic acid are in a mole ratio of 20:80.

12. An amorphous polyamide derived from a mixture consisting of:
(a) para-xylylene diamine;
(b) adipic acid;
(c) isophthalic acid; and
(d) terephthalic acid.

13. An amorphous polyamide derived from a mixture of para-xylylene diamine and dicarboxylic acid, said mixture comprising:
(a) said para-xylylene diamine being present at a level of about 50 mole % based on the total moles of diamine and dicarboxylic acid; and
(b) said dicarboxylic acid consisting of:
(i) adipic acid present at a level of from 20 to 60 mole % based on the total moles of dicarboxylic acid; and
(ii) a phthalic acid composition present at a level of from 40 to 80 mole % based on the total moles of dicarboxylic acid;
said phthalic acid composition having respective amounts of isophthalic acid and terephthalic acid, said isophthalic acid being present at a level of from 60 to 99 mole % based on the total moles of phthalic acid composition, said terephthalic acid being present at a level of from 1 to 40 mole % based on the total moles of phthalic acid composition.

14. An amorphous polyamide derived from diamine and dicarboxylic acid, said diamine and dicarboxylic acid being in mole ratios of from between 48:52 and 52:48, said diamine comprising para-xylylene diamine present at a level of about 50 mole percent based on the total moles of diamine and dicarboxylic acid, said dicarboxylic acid comprising adipic acid and isophthalic acid, said adipic acid being present at a level of from 20 mole % to 40 mole % based on the total moles of diamine and dicarboxylic acid, and said isophthalic acid being present at a level of from 10 mole % to 30 mole % based on the total moles of diamine and dicarboxylic acid.

* * * * *